United States Patent [19]

Kim et al.

[11] Patent Number: 4,556,469

[45] Date of Patent: Dec. 3, 1985

[54] ELECTROLYTIC REACTOR FOR CLEANING WASTEWATER

[75] Inventors: Bang M. Kim; Joseph L. Weininger, both of Schenectady, N.Y.

[73] Assignee: General Electric Environmental Services, Inc., Lebanon, Pa.

[21] Appl. No.: 572,797

[22] Filed: Jan. 23, 1984

Related U.S. Application Data

[62] Division of Ser. No. 320,252, Nov. 12, 1981, Pat. No. 4,445,990.

[51] Int. Cl.⁴ .................. C25B 9/00; C25B 11/03; C25B 11/04; C25B 11/12
[52] U.S. Cl. .................. 204/263; 204/284; 204/291; 204/292; 204/293; 204/294; 204/290 R
[58] Field of Search .............. 204/DIG. 13, 263, 294, 204/283–284, 291–292, 151, 266, 149, 293

[56] References Cited

U.S. PATENT DOCUMENTS

| | | | |
|---|---|---|---|
| 2,588,450 | 3/1952 | Zadra | 204/109 |
| 3,839,090 | 10/1974 | Morelock et al. | 136/36 |
| 3,859,195 | 1/1975 | Williams | 204/272 |
| 3,915,822 | 10/1975 | Veltman | 204/151 |
| 4,013,527 | 3/1977 | Idota et al. | 204/151 |
| 4,046,644 | 9/1977 | Liska | 204/37 |
| 4,046,663 | 9/1977 | Fleet | 204/280 |
| 4,108,754 | 8/1978 | Fleet et al. | 204/263 |
| 4,128,464 | 12/1978 | Idota | 204/151 |
| 4,302,304 | 11/1981 | Ueda et al. | 204/151 X |
| 4,323,442 | 4/1982 | Lantin et al. | 204/266 X |
| 4,326,938 | 4/1982 | Das Gupta et al. | 204/294 X |
| 4,331,523 | 5/1982 | Kawasaki | 204/283 X |
| 4,367,127 | 1/1983 | Messing et al. | 204/263 X |
| 4,367,132 | 1/1983 | Bell et al. | 204/151 X |
| 4,401,519 | 8/1983 | Kadija et al. | 204/292 X |
| 4,436,601 | 3/1984 | Branchick et al. | 204/284 X |
| 4,444,631 | 4/1984 | Bommaraju et al. | 204/291 X |

Primary Examiner—Donald R. Valentine
Attorney, Agent, or Firm—Lawrence D. Cutter; James C. Davis, Jr.; Marvin Snyder

[57] ABSTRACT

Wastewater from metal plating operations is treated to remove heavy metal and other contaminants, including toxic organic materials, chelating agents, and cyanide. The wastewater is passed through the cathode and anode of an electrochemical reactor in which the cathode preferably comprises a felt mass of conductive fibers and the anode comprises porous carbon, carbon fibers or metal oxides. A method and apparatus are disclosed which are particularly useful in removing impurities from plating plant wastewater.

8 Claims, 3 Drawing Figures

ELECTROLYTIC REACTOR FOR CLEANING WASTEWATER

This application is a division of application Ser. No. 320,252, filed Nov. 12, 1981, now U.S. Pat. No. 4,445,990.

BACKGROUND OF THE INVENTION

The present invention relates to an electrochemical method and apparatus for treating plating plant wastewater to remove heavy metal and other contaminants, including toxic organic materials, chelating agents and cyanide which may be present in the wastewater.

During many commercial plating operations, wastewater is generated which contains heavy metal contaminants such as copper, zinc, nickel, lead and cadmium, and other toxic materials, as well as chelating agents. Such wastewater particularly results from electroless and electroplating processes and from metal finishing processes. Because of their toxicity, removal of these metals is desirable. Removal of chelating agents is also desirable because they can disrupt subsequent removal by chemical precipitation operations. Thus, simultaneous removal of heavy metals and destruction of chelating agents is desirable. Additionally, certain plating processes may produce cyanide as a contaminant. Accordingly, it is also desirable to remove this contaminant in plating wastewater treatment processes.

In any electrochemical cell for treating wastewater of the present kind, there are certain very stringent requirements imposed upon the cathode and anode materials. In particular, it is required that the cathode especially exhibit a large reaction surface area. Additionally, the porosity of the cathode should be large (in excess of 85%) to minimize flow restriction. The cathode material should also be able to withstand high levels of metal loading before exhaustion, so that excessively frequent replacement of the cathode material is not required. Moreover, since at least some electrode replacement is necessary during operation of such treatment systems because of electrodeposition of copper or other metal, the cell should be constructed to allow easy disassembly and replacement of the electrodes.

U.S. Pat. No. 3,859,195, issued Jan. 7, 1975 to John M. Williams appears to describe an apparatus for electrochemical processing of ionically-conductive solutions. This patent discusses various previous forms that electrodes have taken, listing, in particular, porous carbon electrodes, carbon block electrodes, electrodes comprising packed beds of carbon particles, fluidized beds of carbon particles, and metallic extended surface electrode structures in the form of loose stainless steel wool pads, citing, in particular, U.S. Pat. No. 2,588,450. The Williams patent appears to disclose the use of woven metallic mesh electrodes in a flow-through mode. However, an important aspect of the device in the Williams patent is the inability of the cathode to be removed from the electrolytic cell and its inability to prevent electrodes from shorting, since it is in a spiral configuration. As is seen below, such construction is inconsistent with the objectives of the instant invention; in particular, in the present invention, a flow-through cathode of different material and design is replaceable, thereby allowing its repeated use in wastewater treatment cycles.

In U.S. Pat. Nos. 4,046,663 and 4,046,644, there are apparently disclosed electrodes comprising carbon fibers or carbon fibers coated with a metallic coating. The electrodes shown there are loose carbon fiber brushes which do not have sufficiently electrically conducting contacts for efficient current collection. Alternatively, woven carbon fiber electrodes would be too dense for effective mass transfer of pollutants to the electrode surface. In contrast, the instant invention employs a highly porous cathode, made of non-woven carbon fibers, with excellent current collection designed specifically for metal recovery operations.

With respect to other known electrodes for electrochemical reactors, these electrodes have included such structures as fluidized beds of metal spheres, metal-coated glass spheres, carbon fiber electrodes (as above), and conventional porous carbon material. Additionally, it is noted that fibrous materials are used in batteries as the fillers and current collectors for the electroactive material, for example, as in U.S. Pat. No. 3,839,090.

In concurrently-filed application Ser. No. 320,250, now abandoned, there is disclosed an electrode structure usable in the method disclosed herein. Accordingly, the aforementioned concurrent application is hereby incorporated herein by reference.

SUMMARY OF THE INVENTION

In accordance with a preferred embodiment of the present invention, a method for treating metal plating operation wastewater to remove heavy metals, toxic organic toxic materials, chelating agents and cyanide comprises the single step of passing the wastewater through a cathode and an anode of an electrochemical cell. The cathode comprises a felt (see below for detailed description) mass of conductive fibers and the anode comprises a felt mass of conductive fibers or a metal oxide. The anode and cathode are separated by a porous nonconductive spacer. An apparatus for the practice of the above-described method is also disclosed.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in conjunction with the accompanying drawings in which:

DETAILED DESCRIPTION OF THE INVENTION

Figure 1:
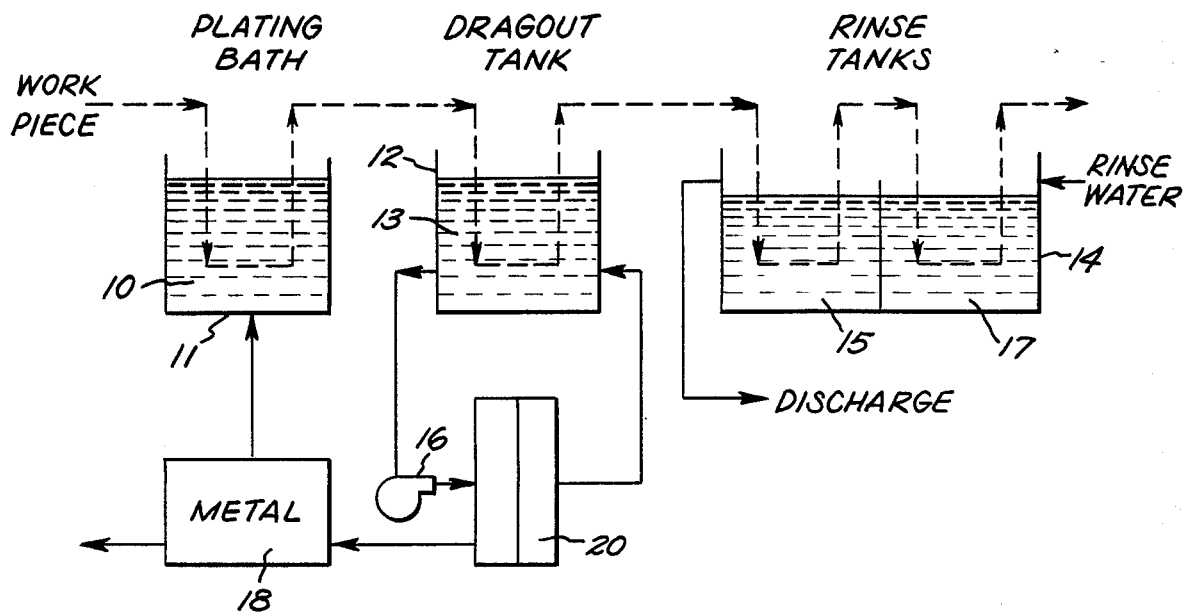
FIG. 1 is a schematic flow diagram illustrating the use of the apparatus of the present invention in a plating process.

FIG. 1 illustrates a typical plating operation process in which the electrochemical cell of the present invention may be employed. A workpiece, such as a printed circuit board to be plated with copper, is immersed in plating tank 10 with plating solution 11 and then transferred to drag-out tank 12 which contains wastewater to be treated. The workpiece is then generally transferred to a rinse tank with compartments 15 and 17 for thorough washing. The contaminants are deposited in the drag-out tank. The wastewater in tank 12 is circulated by pump 16 through reactor 20 which simultaneously operates to electrolytically deposit metal on a cathode and to simultaneously oxidize other impurities at an anode. The treated solution is then returned to the drag-out tank 12. At regular intervals, the cathode is removed from reactor 20 and the reclaimed metal may either be salvaged or returned to plating bath 10, for example, as part of the plating bath anode.

Figure 2:
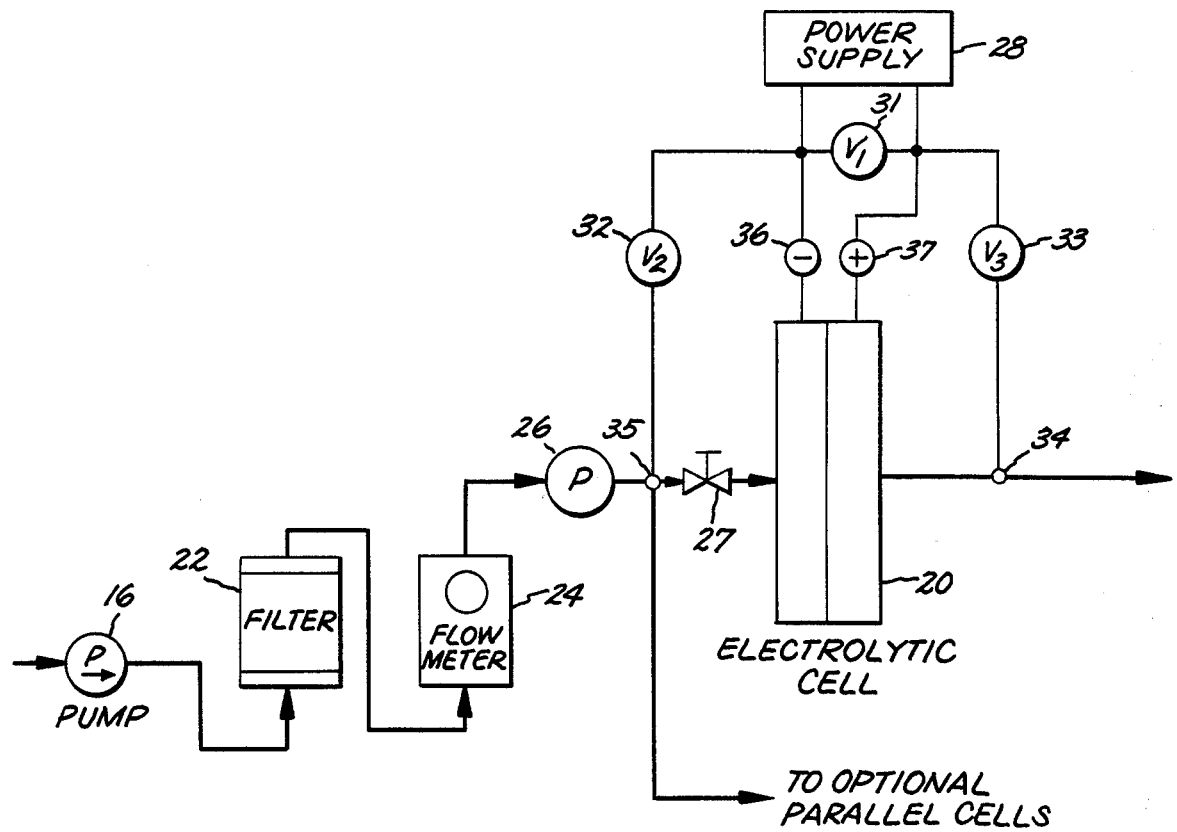
FIG. 2 is a schematic flow diagram illustrating electrical and fluid coupling to the apparatus of the present invention.

FIG. 2 illustrates in more detail reactor 20 and various components associated with it. Again, pump 16 operates to remove solution from drag-out tank 12 and forces solution through filter 22, through flow meter 24, and through pressure indicator 26. The flow meter and pressure indicator are preferably employed to monitor the flow of liquid through electrolytic cell 20. Flow through cell 20 is controlled by valve 27. It should be noted that pump 16 may also supply wastewater to a plurality of cells operated in parallel so that one or more cells may be shut down for electrode replacement. In this manner, continuous wastewater cleanup may be provided. Fluid output from cell 20 is generally returned to drag-out tank 12. Additionally, reference electrodes 35 and 34 may be placed at the inlet and outlet sides, respectively, of electrolytic cell 20 to monitor voltage levels. The cell is driven electrically from direct current power supply 28 which is connected to cathode terminal 36 and anode terminal 37. Voltmeter 31 is employed to measure voltage, $V_1$, across the cell. Additionally, voltmeter 32 is employed to measure voltage $V_2$ across the cell with respect to reference electrode 35. These voltage measurements are useful in determining internal cell conditions. In particular, increases in voltage $V_1$ or $V_2$ may be employed to indicate that the cathode needs replacement. Moreover, a pressure gauge may also be connected to the cell for this same purpose. In particular, a pressure increase indicates that it may be time to replace the cathode. Voltmeter 33 may also be employed to measure voltage $V_3$ across the cell anode with respect to reference electrode 34.

Figure 3:
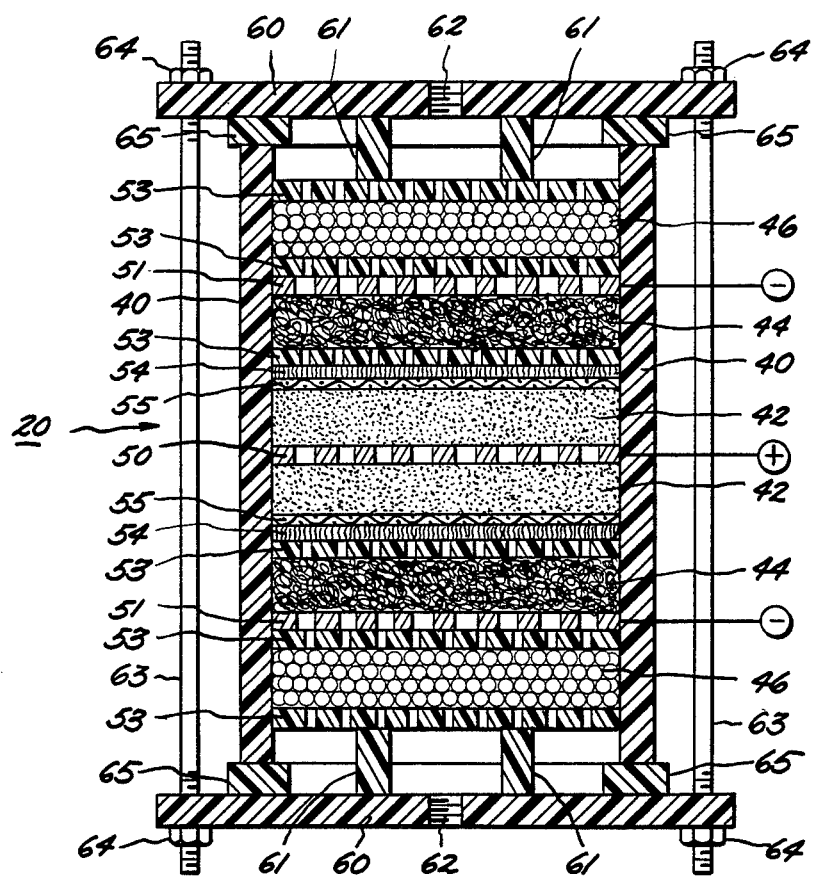
FIG. 3 is a partial cross-sectional side elevational view illustrating one embodiment of the present invention.

FIG. 3 illustrates the detailed construction of an electrochemical cell in accordance with the present invention. The housing of the cell basically comprises cylinder 40 which is typically made of glass, plastic or other nonreactive material. The cell housing is capped at the ends with end plates 60 which typically comprise the same material as cylinder 40 by means of gaskets, such as silicone gaskets 65. Each end plate 60 also preferably include threaded inlet or outlet opening 62 for introduction or removal of wastewater to be treated. The cells may be held together by means of threaded steel rods 63 with end nuts 64.

The interior of cell 20 in FIG. 3 is vertically symmetric about anode electrode 50. Accordingly, since identical parts have the same reference numeral, only the uppermost portion of the internal cell structure is described herein, the bottom portion merely being a mirror image of the top portion. In particular, glass spheres 36, preferably having a diameter of approximately 4 millimeters, are disposed in a section of the top to uniformly randomize the flow through the cell. The glass spheres are maintained in position by being disposed between perforated plastic disks 53. In the cathode there is disposed a felt mass of conductive fibers. These fibers may comprise material such as carbon fibers, nickel wool, stainless steel wool, iron wool, copper wool or bronze wool. This material is compressed into a felt mass. As used here, and in the appended claims, the term "felt" is used to describe a compressed, nonwoven fibrous mass. Additionally, for specific applications, it may also be desirable to have these fibers coated with material such as nickel or copper. The anode may be the same material as described above for the cathode, except that it must be stable under anodic conditions. For example, carbon fibers, nickel and stainless steel fibers can be used under certain conditions, but they are oxidized at a high oxidation potential at the anode. For applications with strongly oxidizing conditions, such as for destruction of toxic organics, flow-through electrodes of electrically conductive multi-valent oxides are preferably employed. $RuO_x$, $NiO_x$ and $MnO_x$ are examples of electrode materials for use under the strongly oxidizing conditions. In the above, x corresponds to a high degree of oxidation. The anode may consist of mixed oxides of one or more multi-valent metals. The high oxidation state coupled with catalytic effects of such electrode materials make it possible to destroy toxic organics, cyanide and chelating agents.

Beneath this cathode structure defined by disks 53, there is disposed disk 54 of porous filter paper and below that there is disposed screen 55 comprising a nonconductive material such as polypropylene. Below this screen there is a flow-through anode 42 which may comprise porous carbon, a carbon fiber felt mass, or, for some applications, a metal oxide such as ruthenium oxide coating on titanium in the form of a dimensionally-stable anode ($DSA^R$) made by the Diamond Shamrock Co. of Cleveland, Ohio. Anode grid 50 is a conductive grid disposed between sections of the flow-through anode material. In particular, the anode material may comprise a high porosity carbon, such as the fuel cell grade electrodes manufactured by the Pure Carbon Company of St. Mary's, Pa.

As metal chelates pass through the cathode, heavy metal ions are reduced and deposited on the cathodes, releasing free chelating agents. The chelating agents are adsorbed on the anode (e.g., porous carbon or metal oxide) and are subsequently oxidized. The final product may be carbon dioxide and oxidation products of ammonia. If the latter oxidation goes to completion, water and nitrogen are produced, but smaller molecular fragments may result from partial oxidation. Complete destruction of the organic chelating groups is not required. In particular, certain longer chain chelating agents are readily broken down into decomposition products without the chelating property.

The material for cathode 44 may comprise a variety of shredded or ribbon-like material such as stainless steel wool or mild steel wool, bronze or copper wool or copper ribbon. The fibers have a diameter of from approximately 1 to approximately 20 micrometers and preferably in the range between 2 and 20 micrometers. All of these materials may be packed uniformly to give a flow-through electrode with a porosity of from about 90% to about 98%.

EXAMPLE I

Tests were made with a wastewater solution from an electroless plating operation. The commercial solution contained 11% sodium hydroxide, 3.5% copper and 6% formaldehyde. An unknown amount of chelating agent and/or other possible unknown components of the solution prevented removal of copper by conventional means. However, almost all the copper was removed by electrodeposition in accordance with the present invention, as evidenced by a complete color change from ultramarine blue to light gray as well as by the electrodeposition of copper. In one case, steel wool was employed as the cathode. Current efficiencies were 92% and 33%, respectively, at medium and high current densities. In another copper deposition experiment, a composite cathode comprising steel wool and current-collecting electrodes comprising perforated and nickel plated steel coils 0.015" thick were used. Copper was deposited on the steel wool and organic material in the wastewater was destroyed by anodic oxidation on a fuel cell grade porous carbon anode. In a single pass through the cell, at a flow rate of 0.2 millimeters per minute, the blue color of the solution disappeared completely while copper was deposited on the steel wool and a titanium collector. Some copper hydroxide was also formed, while the pH changed from 13.2 to 8.9.

EXAMPLE II

An electrochemical reactor comprising four individual cells (two in series and two in parallel) was assembled. Each of the cells had electrodes, both anode and cathode, which were made of compacted carbon fibers, which although compressed still had a void volume of more than 95%. This reactor was used to clean up the overflow from plating bath with identical solution composition as that cited in Example I. A total of 14.9 liters of that solution was treated in five batches over a period of 10¼ hours in either a constant current (CC) or constant voltage (CV) mode. During that time no shorting by dendrite growth or other malfunction of the cells was observed. In the constant current mode, the current was set at 8 amperes, and the voltage was controlled at 14 and 12 volts dc, respectively. The operating parameters and results of the electrodeposition of copper in this batch operation are shown in the following table.

TABLE I

| Batch No. | Duration (Hours) | Mode[1] CV or CC | Solution Volume (ml) | Amt. of Cu Deposited[2] (g) | (equiv.-AH) | Electricity Used[3] (AH) | Current Efficiency % | Energy Used[4] (wh) |
|---|---|---|---|---|---|---|---|---|
| 1 | 2.83 | CV | 2,873 | 9.0 | 7.55 | 13.4 | 56 | 320 |
| 2 | 2.50 | CV | 3,522 | 11.0 | 9.25 | 11.3 | 82 | " |
| 3 | 2.08 | CC | 2,873 | 9.0 | 7.55 | 16.6 | 45 | 499 |
| 4 | 1.73 | CC | 2,950 | 9.2 | 7.75 | 13.9 | 56 | " |
| 5 | 1.10 | CC | 2,734 | 8.5 | 7.18 | 8.8 | 82 | " |

[1]CC = constant current
CV = constant voltage
[2]grams and equivalent ampere hours
[3]ampere-hours
[4]watt-hours Thus, an average current efficiency of 61% was achieved; the efficiency of batches 2 and 5 was 82%. At higher flow rates than 160 ml/min, used in this demonstration, higher current efficiencies are possible.

EXAMPLE III

In another case, a 500 ml. sample of silver cyanide solution, containing 4,920 ppm silver, was passed through an electrolytic cell with carbon felt anode and cathode at a flow rate of 80 ml/min. At a cathodic deposition rate of 1 ampere, on passage of 1.2 ampere-hours of electric current, the silver concentration was reduced to 392 ppm, which corresponded to a current efficiency of 94%.

EXAMPLE IV

In another experiment, copper was removed from a wastewater solution. In this instance, a cathode comprising stainless steel wool pads and an anode comprising a 2" thick porous carbon disk were used. The steel wool, 3" in diameter, was compressed to a height of 1" resulting in a cathode porosity of 90% (density 0.17 grams per cubic centimeter). In the experiment, the original effluent solution was diluted by a factor of 10, and 723 milliliters were then circulated through the reactor for one hour at a rate of 25 to 30 milliliters per minute. Electrodeposition occurred at constant current, initially at 400 milliamps, thereafter lowered for a total charge flow of 1178 coulombs, with an average current of 327 milliamperes. Cell voltage was 2.30 volts. The voltage varied somewhat as gassing occurred and electrode surface coverage fluctuated but polarization did not increase. After about one hour the initially ultramarine solution was clear. Atomic absorption analysis showed that the diluted solution at the start of the experiment contained 247 parts per million of copper and at the end only 0.62 parts per million. Furthermore, evidence of the destruction of the chelating agents is found in the large change in the pH from 13.2 to 8.9. Additionally, the chelating property of the treated solution was treated separately at the end of the experiment. The solution was mixed with 0.1 Molar copper sulfate which was adjusted to a pH of 9 with sodium hydroxide. The copper present in the mixed solution was precipitated as copper hydroxide leaving no blue tint in the liquid layer. This indicated that copper was not present in the solution. Moreover, based on the passage of 1.178 coulombs, at an initial concentration of 0.259 grams per liter of copper in the solution, the current efficiency was computed to be 48%. Additionally, it is noted that some solutions require buffering in order to limit hydrogen evolution during processing. In particular, from 0.05 to 0.5 Molar boric acid was found to be a suitable buffer.

From the above, it may be appreciated that the present invention provides a method and apparatus for the treatment of wastewater, particularly wastewater from metal plating operations, to remove heavy metal contaminants. Simultaneous breakdown of chelating agents and cyanide present in the wastewater was also accomplished. The simultaneous removal of the chelating agents makes any necessary further chemical wastewater processing significantly easier. The materials employed in the present invention are, for the most part, inexpensive and, accordingly, the present invention provides an economically-viable solution to a significant class of wastewater treatment problems.

While the invention has been described in detail herein in accord with certain preferred embodiments thereof, many modifications and changes therein may be affected by those skilled in the art. Accordingly, it is intended by the appended claims to cover all such modifications and changes as fall within the true spirit and scope of the invention.

The invention claimed is:

1. An apparatus for treating metal plating operation wastewater, particularly for removal of metal and breakdown of toxic organics, chelating agents and cyanide, said apparatus comprising:
   a cathode comprising a felt mass of conductive fibers;
   a flow-through anode comprising electrically conductive multivalent metal oxides;
   a nonconductive separator disposed between said cathode and said anode; and
   a housing having said anode, cathode and separator disposed therein and defining a fluid flowpath through said cathode, said separator and said anode, respectively.

2. The apparatus of claim 1 in which said conductive cathode fibers comprise material selected from the group consisting of nickel, stainless steel, iron, copper and bronze.

3. The apparatus of claim 1 in which the porosity of said felt mass is between about 90% and about 98%.

4. The apparatus of claim 1 in which the cathode fibers have a diameter between approximately 1 and approximately 20 micrometers.

5. The apparatus of claim 1 further including means to apply a potential difference between said cathode and said anode.

6. The apparatus of claim 1 further including means to monitor pressure internal to said housing.

7. The apparatus of claim 1 in which said metal oxides are selected from the group consisting of $RuO_x$, $MnO_x$, and $NiO_x$ and mixtures thereof.

8. The apparatus of claim 1 in which said felt mass of conductive fibers is coated with material selected from the group consisting of nickel and copper.

* * * * *